US012652329B2

(12) United States Patent
Jeon et al.

(10) Patent No.: US 12,652,329 B2
(45) Date of Patent: Jun. 9, 2026

(54) DEVICE AND METHOD FOR MERGING DATA FRAMES FOR VEHICLE NETWORK SYSTEM, AND STORAGE MEDIUM STORING INSTRUCTIONS TO PERFORM METHOD FOR MERGING DATA FRAMES

(71) Applicant: Research & Business Foundation SUNGKYUNKWAN UNIVERSITY, Suwon-si (KR)

(72) Inventors: Jae Wook Jeon, Suwon-si (KR); Youngsoo Do, Suwon-si (KR); SungBhin Oh, Suwon-si (KR); Jonghun Kim, Suwon-si (KR); Jaebum Park, Suwon-si (KR); SeJeong Lim, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 116 days.

(21) Appl. No.: 18/787,145

(22) Filed: Jul. 29, 2024

(65) Prior Publication Data

US 2025/0039255 A1 Jan. 30, 2025

(30) Foreign Application Priority Data

Jul. 27, 2023 (KR) ........................ 10-2023-0098293
Jun. 10, 2024 (KR) ........................ 10-2024-0074839

(51) Int. Cl.
| | |
|---|---|
| G06F 15/16 | (2006.01) |
| H04L 65/65 | (2022.01) |
| H04L 65/75 | (2022.01) |
| H04L 69/22 | (2022.01) |

(52) U.S. Cl.
CPC .............. *H04L 65/75* (2022.05); *H04L 65/65* (2022.05); *H04L 69/22* (2013.01)

(58) Field of Classification Search
CPC .......... H04L 65/65; H04L 65/75; H04L 69/22
USPC ......................................................... 709/224
See application file for complete search history.

(56) References Cited

U.S. PATENT DOCUMENTS

| | | | | |
|---|---|---|---|---|
| 9,680,957 | B2 * | 6/2017 | Bergmann | ........ H04M 15/8088 |
| 10,530,560 | B2 * | 1/2020 | Vermeulen | ............ G06F 1/3287 |
| 10,680,847 | B2 * | 6/2020 | Ujiie | ................... H04L 63/1466 |
| 10,791,516 | B1 * | 9/2020 | Chu | ................... H04W 52/0216 |
| 10,966,070 | B2 * | 3/2021 | Condeixa | ................ H04W 4/46 |
| 10,979,245 | B2 * | 4/2021 | Ujiie | .................... H04B 1/3822 |
| 11,282,308 | B2 * | 3/2022 | Jung | ................... H04L 43/0852 |
| 11,310,638 | B2 * | 4/2022 | Back | ...................... H04L 45/745 |
| 11,477,626 | B2 * | 10/2022 | Tsau | ........................ H04L 67/12 |
| 11,522,733 | B2 * | 12/2022 | Ujiie | .................... H04B 1/3822 |
| 11,539,727 | B2 * | 12/2022 | Haga | .................. H04L 12/40026 |

(Continued)

FOREIGN PATENT DOCUMENTS

| | | |
|---|---|---|
| JP | 2023-008113 A | 1/2023 |
| KR | 10-2125875 B1 | 6/2020 |
| KR | 10-2393816 B1 | 5/2022 |

*Primary Examiner* — Moustafa M Meky

(57) ABSTRACT

There is provided a method for merging data frames performed by a data frame merge device for a vehicle network system. The method comprises receiving a plurality of control data frames from a lower level of the vehicle network system; and merging the plurality of control data frames for a preset standby time in a traffic section in which the plurality of the control data frames are not transmitted to a higher level of the vehicle network system.

20 Claims, 16 Drawing Sheets

(56) References Cited

U.S. PATENT DOCUMENTS

| | | | | |
|---|---|---|---|---|
| 11,683,371 | B2 * | 6/2023 | Yasay | H04L 67/1097 |
| | | | | 709/213 |
| 11,995,181 | B2 * | 5/2024 | Kishikawa | B60W 40/09 |
| 12,017,658 | B2 * | 6/2024 | Miller | G08G 1/096791 |
| 12,200,589 | B2 * | 1/2025 | Tsau | H04L 69/324 |
| 12,362,965 | B2 * | 7/2025 | Yamamoto | H04L 12/46 |
| 12,363,149 | B2 * | 7/2025 | Schmidt | G06F 21/552 |
| 12,513,021 | B2 * | 12/2025 | Kitagawa | H04L 12/40052 |
| 2010/0234071 | A1 * | 9/2010 | Shabtay | H04B 7/155 |
| | | | | 455/562.1 |
| 2017/0118038 | A1 * | 4/2017 | Ujiie | H04B 1/3822 |
| 2019/0312892 | A1 * | 10/2019 | Chung | G06F 21/554 |
| 2020/0137099 | A1 * | 4/2020 | Haga | H04W 4/48 |
| 2020/0259677 | A1 * | 8/2020 | Ujiie | H04L 12/66 |
| 2020/0394853 | A1 * | 12/2020 | Jung | H04L 12/66 |
| 2021/0203525 | A1 * | 7/2021 | Ujiie | H04L 12/66 |
| 2022/0176972 | A1 * | 6/2022 | Miller | G08G 1/096725 |
| 2022/0201449 | A1 * | 6/2022 | Tsau | H04L 69/324 |
| 2022/0231958 | A1 * | 7/2022 | Roy | H04L 47/622 |
| 2023/0007460 | A1 * | 1/2023 | Tsau | H04W 4/48 |
| 2023/0254327 | A1 * | 8/2023 | Schmidt | H04L 63/1425 |
| | | | | 726/23 |
| 2024/0187277 | A1 * | 6/2024 | Kitagawa | H04L 12/40052 |

* cited by examiner

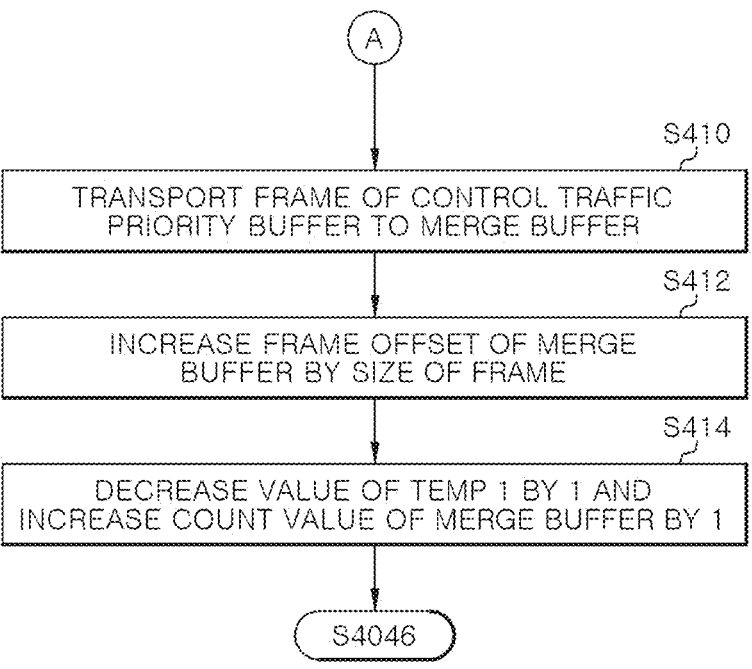

Ⓐ

S410
TRANSPORT FRAME OF CONTROL TRAFFIC
PRIORITY BUFFER TO MERGE BUFFER

S412
INCREASE FRAME OFFSET OF MERGE
BUFFER BY SIZE OF FRAME

S414
DECREASE VALUE OF TEMP 1 BY 1 AND
INCREASE COUNT VALUE OF MERGE BUFFER BY 1

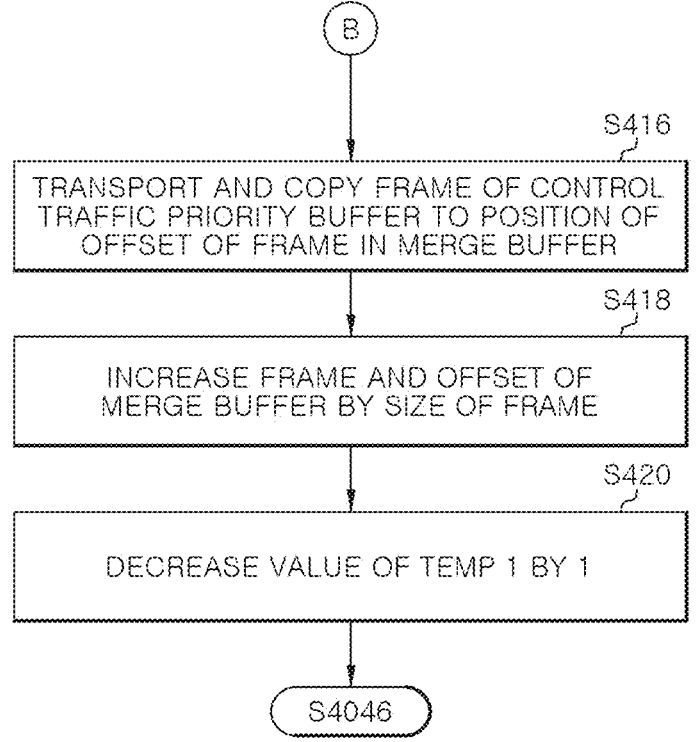

Ⓑ

S416
TRANSPORT AND COPY FRAME OF CONTROL
TRAFFIC PRIORITY BUFFER TO POSITION OF
OFFSET OF FRAME IN MERGE BUFFER

S418
INCREASE FRAME AND OFFSET OF
MERGE BUFFER BY SIZE OF FRAME

S420
DECREASE VALUE OF TEMP 1 BY 1

S4046

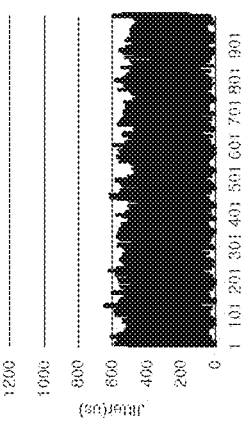
*FIG. 17D*
*FIG. 17C*
*FIG. 17B*
*FIG. 17A*
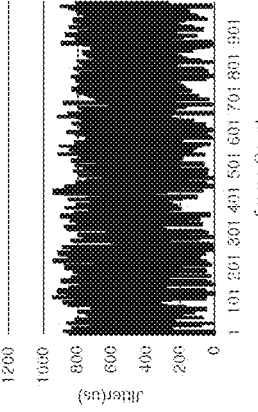
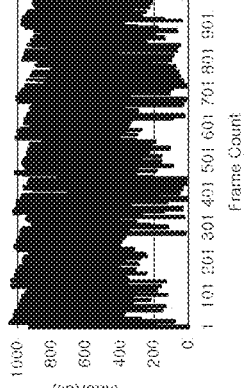

DEVICE AND METHOD FOR MERGING DATA FRAMES FOR VEHICLE NETWORK SYSTEM, AND STORAGE MEDIUM STORING INSTRUCTIONS TO PERFORM METHOD FOR MERGING DATA FRAMES

CROSS REFERENCE TO RELATED APPLICATION

The present application claims priority to a KR application 10-2023-0098293, filed Jul. 27, 2023, and a KR application 10-2024-0074839, filed Jun. 10, 2024, the entire contents of which are incorporated herein for all purposes by this reference.

TECHNICAL FIELD

The disclosure relates to data frame merging in a vehicle network system.

This work was supported by Institute for Information & Communications Technology Planning & Evaluation (IITP) grant funded by Korea government (MSIT; Ministry of Science and ICT) (No. 2021-0-01364-003, SW Starlab: Real-time Intelligent Traffic Monitoring System on Edge Devices).

BACKGROUND

Currently, the vehicle-related field is experiencing various changes such as changes in autonomous driving and vehicle platforms, and expansion of infrastructure through connected cars. The in-vehicle communication system uses a mixture of real-time control data frames such as engine or brake status information and multimedia data frames including audio data and video data in a single network.

In order to mix and use control data frames that require real-time and reliability and large-capacity multimedia data frames in one network with low delay/low jitter, the IEEE group has announced a standard protocol called Ethernet-based time sensitive networking (TSN).

Although research is actively underway to apply this protocol to vehicles, current studies are focused on the Ethernet-based higher level (end system and switches, switches and switches), and research on scheduling methods between end systems and lower level devices (electronic control unit (ECU), actuator, sensor, etc.) is lacking. In addition, in order to transmit lower level data including controller area network (CAN), CAN with flexible data rate (CAN-FD), local interconnect network (LIN), and Ethernet to the higher level, an operation of converting protocols between heterogeneous networks is inevitably required.

SUMMARY OF THE INVENTION

When an end system supporting an embedded system-based TSN protocol receives each CAN and Ethernet frames and delivers the received CAN and Ethernet frames to Ethernet switches, an embodiment of the disclosure proposes a data frame merge technology for a vehicle network system that can merge the CAN frame and Ethernet frame into one frame and transmit the merged frame in consideration of whether to merge the frames in case of converting the CAN frames corresponding to control data frames into Ethernet frames is proposed.

In accordance with an aspect of the present disclosure, there is provided a method for merging data frames performed by a data frame merge device for a vehicle network system, the method comprises: receiving a plurality of control data frames from a lower level of the vehicle network system; and merging the plurality of control data frames for a preset standby time in a traffic section in which the plurality of the control data frames are not transmitted to a higher level of the vehicle network system.

Additionally, the merging the plurality of control data frames may include storing the plurality of the control data frames as a plurality of standby frames or merging the plurality of the control data frames with a plurality of pre-stored standby frames on the basis of a count value of a merge buffer of the data frame merge device in case that the plurality of the control data frames is transmitted in the traffic section that is not connected to an output buffer of the data frame merge device.

Additionally, merging the plurality of control data frames may include identifying the count value of the merge buffer; storing the plurality of the control data frames as the plurality of the standby frames in the merge buffer if the count value of the merge buffer is 0; and storing a plurality of merge control data frames obtained by merging the plurality of the control data frames with the plurality of the pre-stored standby frames in the merge buffer if the count value of the merge buffer exceeds 0.

Additionally, the method for merging data frames further comprises storing a plurality of controller area network (CAN) data frames and a plurality of Ethernet data frames received from a control device provided in the vehicle network system in each input buffer; extracting the plurality of the control data frames from the CAN data frame and storing the plurality of the control data frames in a control frame priority buffer; and extracting a plurality of multimedia data frames and a plurality of text data frames from the plurality of the Ethernet data frames, and storing the plurality of the multimedia data frames in a multimedia frame priority buffer and the plurality of the text data frames in a text frame priority buffer, respectively.

Additionally, the traffic section may include a scheduled traffic section, an other traffic section, and a guard band section, the scheduled traffic section may be the traffic section in which the plurality of the control data frames is transmitted in connection with the output buffer, the other traffic section may be the traffic section in which the plurality of the multimedia data frames or the plurality of the text data frames is transmitted in connection with the output buffer, and the guard band section may be a section in which all of the plurality of the control data frames, the plurality of the multimedia data frames, and the plurality of the text data frames are not transmitted to the output buffer.

Additionally, the merging the plurality of control data frames may include temporarily storing a count value of the control frame priority buffer if a current traffic section of the plurality of the control data frames is the other traffic section or the guard band section and the count value of the control frame priority buffer is 2 or more.

Additionally, the merging the plurality of control data frames may include temporarily storing a count value of the control frame priority buffer if a count value of a period in which data for the merge buffer is stored exceeds a predetermined threshold period, and the count value of the control frame priority buffer is 2 or more.

Additionally, the merging the plurality of control data frames may include temporarily storing a count value of the control frame priority buffer if a current traffic section of the plurality of the control data frames is the other traffic section or the guard band section, a count value of a period in which data for the merge buffer is stored exceeds a predetermined threshold period, and the count value of the control frame priority buffer is 2 or more.

Additionally, the merging the plurality of control data frames may include transporting the plurality of the control data frames stored in the control frame priority buffer to the merge buffer if a temporary storage count value of the control frame priority buffer exceeds 0 and a count value of a period in which data for the merge buffer is stored is 0.

Additionally, the merging the plurality of control data frames may include transporting a plurality of control data frames stored in the control frame priority buffer to an offset position of the standby frame stored in the merge buffer if a temporary storage count value of the control frame priority buffer exceeds 0 and a count value of a period in which data for the merge buffer is stored exceeds 0.

Additionally, the merging the plurality of control data frames may include transporting the plurality of the merge control data frames stored in the merge buffer to the control frame priority buffer if a temporary storage count value of the control frame priority buffer is 0.

In accordance with another aspect of the present disclosure, there is provided a device for merging data frames for a vehicle network system, the device comprises: a memory configured to store one or more instructions; and a processor configured to execute the one or more instructions stored in the memory, wherein the instructions, when executed by the processor, cause the processor to: store a plurality of controller area network (CAN) data frames and a plurality of Ethernet data frames received from a control device provided in the vehicle network system in each input buffer; extract a plurality of the control data frames from the plurality of the CAN data frames, and extract a plurality of multimedia data frames and a plurality of text data frames from the plurality of the Ethernet data frames; set a traffic section to transport at least one of the plurality of the control data frames, the plurality of multimedia data frames, and the plurality of text data frames to an output buffer through a transport section; and store the plurality of the control data frames in the plurality of the CAN data frames as a plurality of standby frames or merge the plurality of the control data frames with a plurality of pre-stored standby frames and transport the plurality of the merged the control data frames to the output buffer in a traffic section in which the plurality of the control data frames is not transmitted to the output buffer.

Additionally, the processor may be configured to preferentially extract the plurality of the control data frames, the plurality of multimedia data frames, and the plurality of text data frames, store the plurality of the control data frames in a control frame priority buffer in queue format, and store the plurality of the control data frames as the plurality of standby frames or a plurality of merge control data frames merged the plurality of the control data frames with the plurality of pre-stored standby frames in a merge buffer Additionally, the traffic section may include a scheduled traffic section, an other traffic section, and a guard band section, and the processor may be configured to temporarily store a count value of the control frame priority buffer if a current traffic section of the plurality of the control data frames is the other traffic section or the guard band section and the count value of the control frame priority buffer is 2 or more.

Additionally, the processor may be configured to temporarily store a count value of the control frame priority buffer if a count value of a period in which data for the merge buffer is stored exceeds a predetermined threshold period, and the count value of the control frame priority buffer is 2 or more.

Additionally, the processor may be configured to store the plurality of multimedia data frames in a multimedia data frame priority buffer in the queue format, and store the plurality of text data frames in a text data frame priority buffer in the queue format.

Additionally, the processor may include a first gateway configured to be opened in the scheduled traffic section to transport the plurality of the control data frames stored in the control frame priority buffer to the output buffer, a second gateway configured to be opened in the other traffic section to transport the plurality of the multimedia data frames stored in the multimedia data frame priority buffer to the output buffer, and a third gateway configured to be opened in the other traffic section to transport the plurality of the text data frames stored in the text data frame priority buffer to the output buffer.

Additionally, the processor may be configured to open the first gateway and to close the second gateway and the third gateway in the scheduled traffic section, to open the second gateway or the second gateway and to close the first gateway in the other traffic section, and to close the first gateway, the second gateway, and the third gateway in the guard band section.

Additionally, the multimedia data frame priority buffer may include video multimedia frame priority buffer and audio multimedia frame priority buffer, and the processor may include a weight filter configured to set weights to maintain relative balance for a video frame and an audio frame output from the video multimedia frame priority buffer and the audio multimedia frame priority buffer, respectively, and output the video frame and the audio frame as a single multimedia frame data, a second priority filter configured to determine output according to the priority between the single multimedia frame data that has passed the weight filter and the plurality of the text data frames stored in the text frame priority buffer, and a data frame scheduler configured to schedule one data frame to be transported to the output buffer of the output unit through at least one priority buffer of the control frame priority buffer, the multimedia frame priority buffer, and the text frame priority buffer, on the basis of the open/close operations of the first gateway, the second gateway, and the third gateway.

In accordance with another aspect of the present disclosure, there is provided a non-transitory computer readable storage medium storing computer program including computer executable instructions, wherein the instructions, when executed by a processor, cause the processor to perform a method for merging data frames, the method comprising: receiving a plurality of control data frames from a lower level of the vehicle network system; and merging the plurality of control data frames for a preset standby time in a traffic section in which the plurality of the control data frames are not transmitted to a higher level of the vehicle network system.

In accordance with another aspect of the present disclosure, there is provided computer program including computer executable instructions stored in a non-transitory computer readable storage medium, wherein the instructions, when executed by a processor, cause the processor to perform a method for merging data frames, the method comprising: receiving a plurality of control data frames from a lower level of the vehicle network system; and merging the plurality of control data frames for a preset standby time in a traffic section in which the plurality of the control data frames are not transmitted to a higher level of the vehicle network system. According to an embodiment of the disclosure, in case that multiple control data frames including CAN data frames are merged into an Ethernet frame and transmitted, overhead for the Ethernet header can be reduced. In addition, according to an embodiment of the disclosure, during a time period in which a control data frame received in a section other than a scheduled traffic is standby in the priority buffer, multiple standby frames are merged and transmitted to a higher level switching device, thereby minimizing a frame transmission time.

BRIEF DESCRIPTION OF THE DRAWINGS

First.

FIG. 11 is a flowchart for illustratively explaining a case in which the count of the merge buffer is 0 during the merge process in FIGS. 8 to 10.

FIG. 12 is a flowchart for illustratively explaining a case in which the count of the merge buffer exceeds 0 during the merge process in FIGS. 8 to 10.

FIGS. 17A to 17D are graphs comparing the jitter performance of four different methods to verify the effectiveness of the method proposed in an embodiment of the present invention.

DETAILED DESCRIPTION OF THE INVENTION

Figure 1:
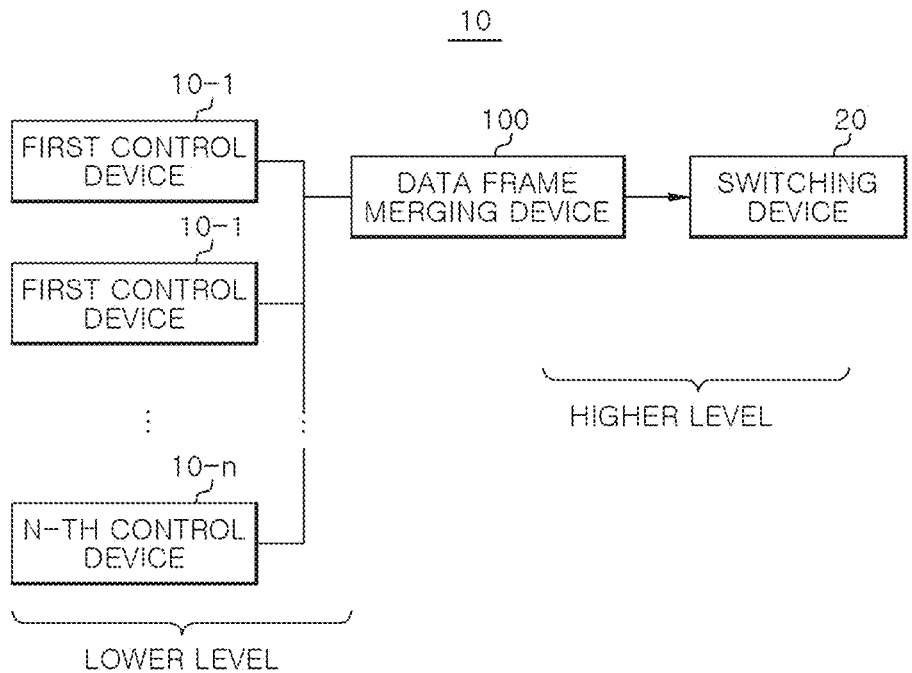
FIG. 1 is a schematic block diagram of a vehicle network system to which a data frame merge device 100 according to an embodiment of the disclosure is applied.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that apart in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

The terms such as ' . . . unit' and ' . . . group' as used below refer to a unit that processes at least one function or motion, and may be implemented as a hardware, a software, or a combination of the hardware and the software.

TSN-based systems are focused on scheduling methods between end systems and switches, or between switches, and there is no research on scheduling frames at the lower level (e.g., electronic control unit (ECU), actuator, sensor, etc.) while supporting the Ethernet-based TSN protocol.

Existing vehicle internal systems are changing from a central gateway system to a domain-based network structure. In the domain-based network structure, lower level ECUs are connected to each sensor or actuator, and various networks such as CAN, CAN-FD, LIN, and Ethernet are applied. In this structure, one end system must inevitably receive data frames from lower networks (e.g., CAN, CAN- FD, LIN, Ethernet, etc.), change the received data frames into Ethernet frames, and transmit the Ethernet frames to the higher level.

In the process of converting a data frame, in the case of a CAN frame, the data size of one data frame is up to 8 bytes, and the data size of an Ethernet frame is approximately 1,500 bytes. In this situation, if CAN frames are simply converted to Ethernet frames and transmitted in the order in which data frames arrive, the utilization of Ethernet frames may be reduced. In addition, in order to transmit an Ethernet frame, an additional 22 bytes of header are required, and in case that frames are not merged, an overhead equal to the header byte will occur from the second frame.

Accordingly, an embodiment of the disclosure proposes a process of selecting a standard for merging control data frames including CAN frames in an end system supporting TSN and merging the control data frames into one Ethernet frame. This improves scheduling efficiency by performing merge operations during the delay time occurring in the priority buffer of the TSN structure, and can reduce the overhead occurring in the header of the Ethernet frame by merging data frames.

Hereinafter, embodiments of the disclosure will be described in detail with reference to the attached drawings.

FIG. 1 is a schematic block diagram of a vehicle network system 1 to which a data frame merge device 100 according to an embodiment of the disclosure is applied.

As illustrated in FIG. 1, the vehicle network system 1 includes lower level control devices 10-1 to 10-n, a higher level switching device 20, and a data frame merge device 100 connected between the control devices 10-1 to 10-n and the switching device 20.

Any control device among the control devices 10-1 to 10-n, for example, the first control device 10-1, may include an electronic control unit (ECU) connected to sensors, actuators, etc. in the vehicle network system 1. CAN data frames and Ethernet data frames may be delivered to the data frame merge device 100 through the first control device 10-1 including the ECU.

The switching device 20 constitutes the higher level of the vehicle network system 1 and can receive Ethernet data frames through the data frame merge device 100.

The data frame merge device 100 according to an embodiment of the disclosure may process data frames transmitted from the lower level control devices 10-1 to 10-n, and deliver the processed data frames to the higher level switching device 20. In particular, the data frame merge device 100 may receive control data frames from the lower level control devices 10-1 to 10-n through a CAN data port, and may receive multimedia data frames or text data frames from the control devices 10-1 to 10-n through an Ethernet data port, and may serve to merge a plurality of control data frames during a preset standby time in a traffic section where control data frames are not transmitted to the higher level of the vehicle network system 1.

This data frame merge device 100 will be described in detail with reference to FIGS. 2 and 3.

Figure 2:
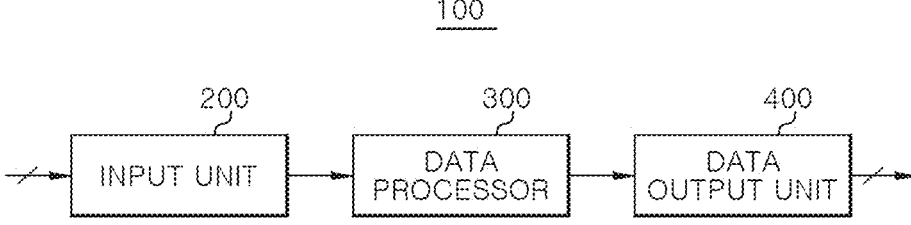
FIG. 2 is a block diagram for schematically explaining the function of the data frame merge device 100 according to an embodiment of the disclosure.
Figure 3:
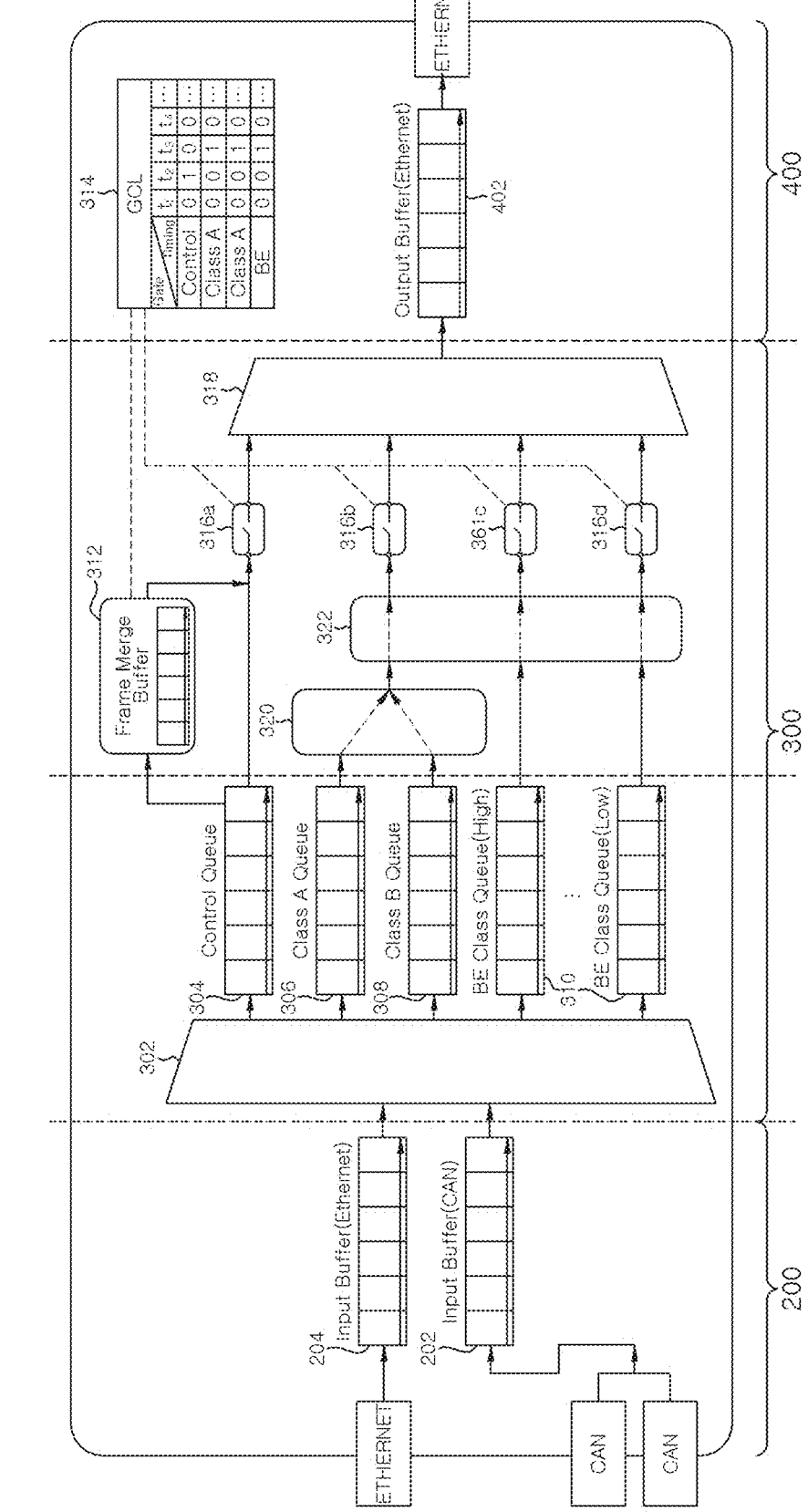
FIG. 3 is a conceptual diagram for explaining in detail the function of the data frame merge device 100 of FIG. 1.

FIG. 2 is a block diagram for schematically explaining the function of the data frame merge device 100 according to an embodiment of the disclosure, and FIG. 3 is a conceptual diagram for explaining in detail the function of the data frame merge device 100 of FIG. 1.

First, the data frame merge device 100 may include an input unit 200, a processor 300, and an output unit 400.

The input unit 200 may store CAN data frames and Ethernet data frames received from the control device of the vehicle network system 1, for example, the first control device 10-1, in respective input buffers.

To this end, the input unit 200 may include an input buffer 202 for CAN data frames and an input buffer 204 for Ethernet data frames.

The input buffer 202 for CAN data frames may store CAN data frames input through a CAN data port, and the input buffer 204 for Ethernet data frames may store Ethernet data frames input through an Ethernet data port. In this way, the CAN data frame and Ethernet data frame stored in the input buffer 202 for the CAN data frame and input buffer 204 for the Ethernet data frame, respectively, may be provided to the processor 300, which will be described later.

The processor 300 may extract control data frames from the CAN data frames stored in the input buffer 202 for CAN data frames, and extract multimedia data frames and text data frames from the Ethernet data frames stored in the input buffer 204 for Ethernet data frames. In addition, the processor 300 may sequentially configure the traffic section so that any one data frame of the control data frame, multimedia data frame and text data frame transports to the output buffer through the transmission section, while storing the control data frame in the CAN data frame as a standby frame or merging the control data frame with the standby frame to transport the merged frame to the output buffer in a traffic section where the control data frame is not transported to the output buffer.

To this end, the processor 300 may include a first priority filter 302, a control frame priority buffer 304, a multimedia frame priority buffer for video 306, a multimedia frame priority buffer for audio 308, a text frame priority buffer 310, a merger 312, a traffic section set table 314, gateways 316a to 316d, a data frame scheduler 318, a weight filter 320, and a second priority filter 322.

The first priority filter 302 may extract control data frames, multimedia data frames, and text data frames, and deliver each extracted data frame to each of the priority buffers 304 to 310.

The control frame priority buffer 304 may store the control data frame extracted from the first priority filter 302 in the form of a queue.

The multimedia frame priority buffers 306 and 308 may store the multimedia data frames extracted from the first priority filter 302 in the form of a queue. These multimedia frame priority buffers 306 and 308 may be classified into the multimedia frame priority buffer for video 306 and the multimedia frame priority buffer for audio 308.

The text frame priority buffer 310 may store the text data frame extracted from the first priority filter 302 in the form of a queue.

The merger 312 may store the control data frame stored in the control frame priority buffer 304 as a standby frame, or store a merged control data frame obtained by merging the standby frame and control data frame in a separate merge buffer.

This merger 312 may determine whether the traffic section of the current input frame is a scheduled traffic section, an other traffic section, or a guard band section on the basis of a separate traffic section set table 314.

To configure such traffic sections, a gateway control list table as shown in Table 1 below may be used in the form of a lookup table.

TABLE 1

| Transmission section | Data frame | Timing(t1) | Timing(t2) | Timing(t3) | Timing(t4) . . . |
|---|---|---|---|---|---|
| Scheduled traffic | Control frame | 0 | 1 | 0 | 0 . . . |
| Other traffic | Video frame | 0 | 0 | 1 | 0 . . . |
| | Audio frame | 0 | 0 | 1 | 0 . . . |
| Guard band | BE (best effort) | 10 | 0 | 1 | 0 . . . |

The traffic section in the vehicle network system 1 to which an embodiment of the disclosure is applied may include a scheduled traffic section, an other traffic section, and a guard band section. Accordingly, if the current traffic region of the control data frame is not the scheduled traffic section, the count value of the merge period of the merger 312 exceeds a threshold period, and the count value of the control frame priority buffer is 2 or more, the processor 300 may temporarily store the count value of the control frame priority buffer.

In addition, if the temporary storage count value of the control frame priority buffer 304 exceeds 0 and the count value of the merge buffer of the merger 312 is 0, the processor 300 may transport the control data frame stored in the control frame priority buffer 304 to the merge buffer.

In addition, if the temporary storage count value of the control frame priority buffer 304 exceeds 0 and the count value of the merge buffer exceeds 0, the processor 300 may transport the control data frame stored in the control frame priority buffer 304 to the offset position of the standby frame stored in the merge buffer.

In addition, if the temporary storage count value of the control frame priority buffer 304 is 0, the processor 300 may transport the merged control data frame stored in the merge buffer to the control frame priority buffer 304.

The first gateway 316a may operate to be open in the scheduled traffic section and transport the control data frame stored in the control frame priority buffer 304 to the output unit 400.

The second gateway 316b may operate to be open in the other traffic section and transport the multimedia data frames stored in the multimedia frame priority buffers 306 and 308 to the output unit 400.

The third gateway 316c may operate to be open in the other traffic section and transport the text data frame stored in the text frame priority buffer 310 to the output unit 400.

Accordingly, the processor 300 opens the first gateway 316a and closes the second and third gateways 316b and 316c in the scheduled traffic section, thereby allowing the control data frame to transport to the output unit 400. The processor 300 opens the second gateway 316b or third gateway 316c and closes the first gateway 316a in the other traffic section, thereby allowing the multimedia data frame to transport to the output unit 400. The processor 300 closes all the first, second, third and fourth gateways 316a, 316b, 316c, 316d in the guard band section, thereby preventing any data frames from being transmitted.

That is, the processor 300 controls the open/close operation of each of the gateways 316a to 316d behind each of the priority buffers 304 to 310 to configure the transmission sections of control frames and multimedia/text frames while the scheduled traffic section (control frame transmission), other traffic section (multimedia/text frame transmission), and guard band section are repeated within one cycle.

Each traffic section is repeated only once within one cycle, and the guard band section refers to a section in which no traffic begins to be transmitted to prevent the loss of control data frames (high priority) transmitted only in the scheduled traffic section. Accordingly, the guard band section may be set to a size that allows the maximum size of one frame to be transmitted. In addition, the reason it is divided into the scheduled traffic section and the other traffic section is to prevent loss or delay of control data frames and maintain smoother transmission conditions. In the case of multimedia data frames, the size is generally large, so transmission takes a long time. In order to prevent delay in the control data frame in the process of transmitting the data frame, a separate region where only the control data frame may be transmitted is generated and the transmission delay of the control data frame may be minimized.

Such cycle period, traffic section set order, etc. may be configured in advance.

Meanwhile, the processor 300 may further include the weight filter 320 that sets weights to maintain relative balance for the video frames and audio frames output from the multimedia frame priority buffer for video 306 and the multimedia frame priority buffer for audio 308, respectively, and outputs them as a single multimedia frame data, the second priority filter 322 that determines output according to the priority between the single multimedia frame data that has passed the weight filter 320 and the text data frame stored in the text frame priority buffer 310, and a data frame scheduler 318 that schedules one data frame to be transported to the output buffer 402 of the output unit 400 through any one priority buffer of the control frame priority buffer 304, multimedia frame priority buffers 306 and 308, and text frame priority buffer 310, on the basis of the open/close operations of the first gateway 316a, second gateway 316b, third gateway 316c, and fourth gateway 316d.

Hereinafter, a method for merging data frames according to an embodiment of the disclosure, along with the above-described configuration, will be described in more detail with reference to the accompanying FIGS. 4 to 16.

Figure 4:
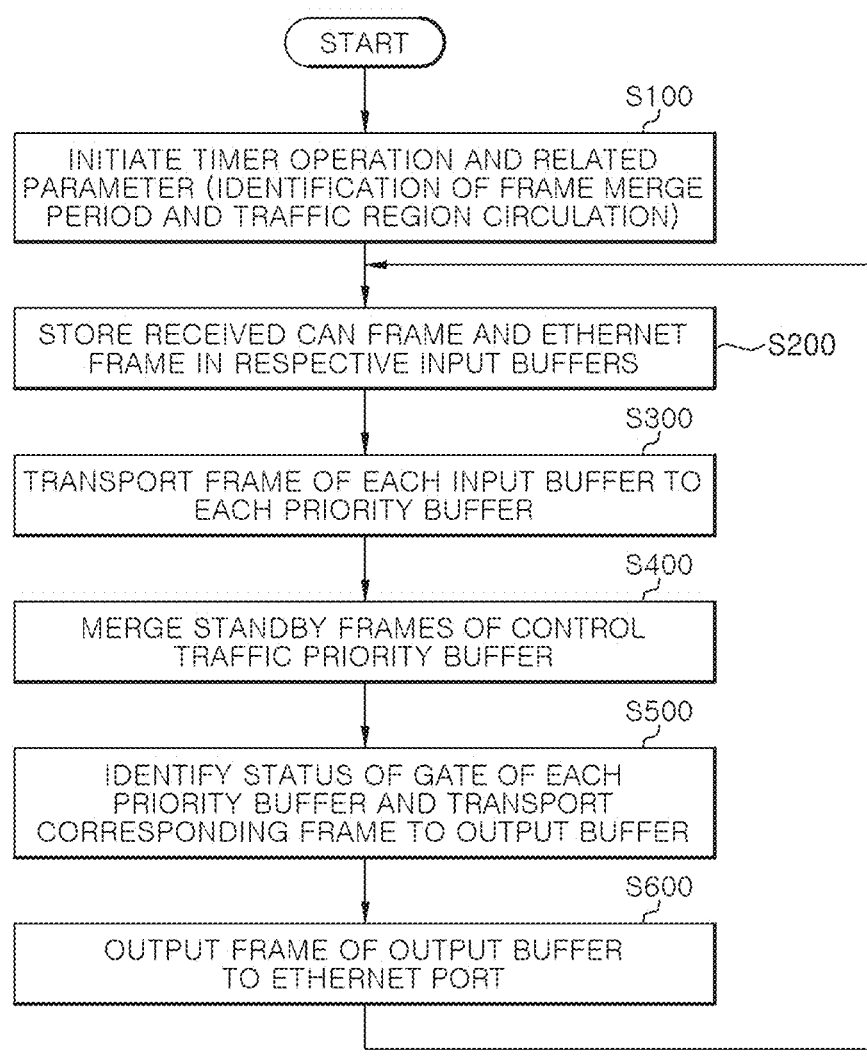
FIG. 4 is a flowchart illustrating a method for merging data frames of the data frame merge device 100 according to an embodiment of the disclosure.

First, FIG. 4 is a flowchart illustrating a method for merging data frames of the data frame merge device 100 according to an embodiment of the disclosure.

As illustrated in FIG. 4, a method for merging data frames includes identifying a frame merge period and initializing a timer operation and related parameters for traffic section circulation (S100), storing the received CAN data frame or Ethernet data frame into each input buffer 202 or 204 (S200), transporting the frame of each input buffer 202 or 204 to each of the priority buffers 304 to 310 (S300), merging the standby frames of the control frame priority buffer 304 (S400), identifying the status of the gateways 316a to 316d of each of the priority buffers 304 to 310 and transporting the corresponding frame to the output buffer 402 (S500), and outputting the frame in the output buffer 402 to an Ethernet port (S600).

This method for merging data frames may include repeatedly performing the operations (S100 to S600).

Figure 5:
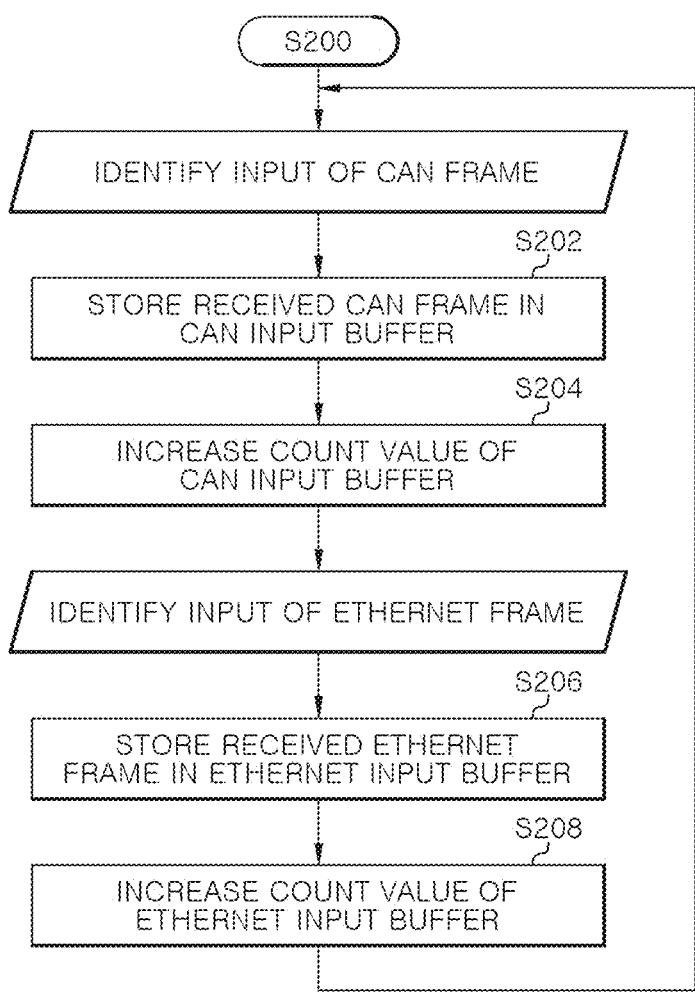
FIG. 5 is a flowchart specifically explaining the input buffer storage process (S200) in FIG. 4.

FIG. 5 is a flowchart specifically explaining the input buffer storage process (S200) in FIG. 4, and is a diagram for illustratively explaining the process of storing received CAN data frames or Ethernet data frames in each input buffer 202 or 204.

In FIG. 1, the CAN frames and Ethernet frames transmitted by the plurality of control devices 10-1 to **10-*n* are received by the input unit 200** (the number of the respective control devices may be changed flexibly).

The method may further include, storing the CAN frame in the input buffer for CAN data frames 202 (S202) after the process of identifying the frame input for the received frames as illustrated in FIG. 5, increasing a count value indicating the number of frames in the input buffer for CAN data frames 202 (S204), storing the Ethernet frame in the input buffer for Ethernet data frames 204 (S206), and increase a count value displaying the number of frames in the input buffer for Ethernet data frames 204 (S208).

Figure 6:
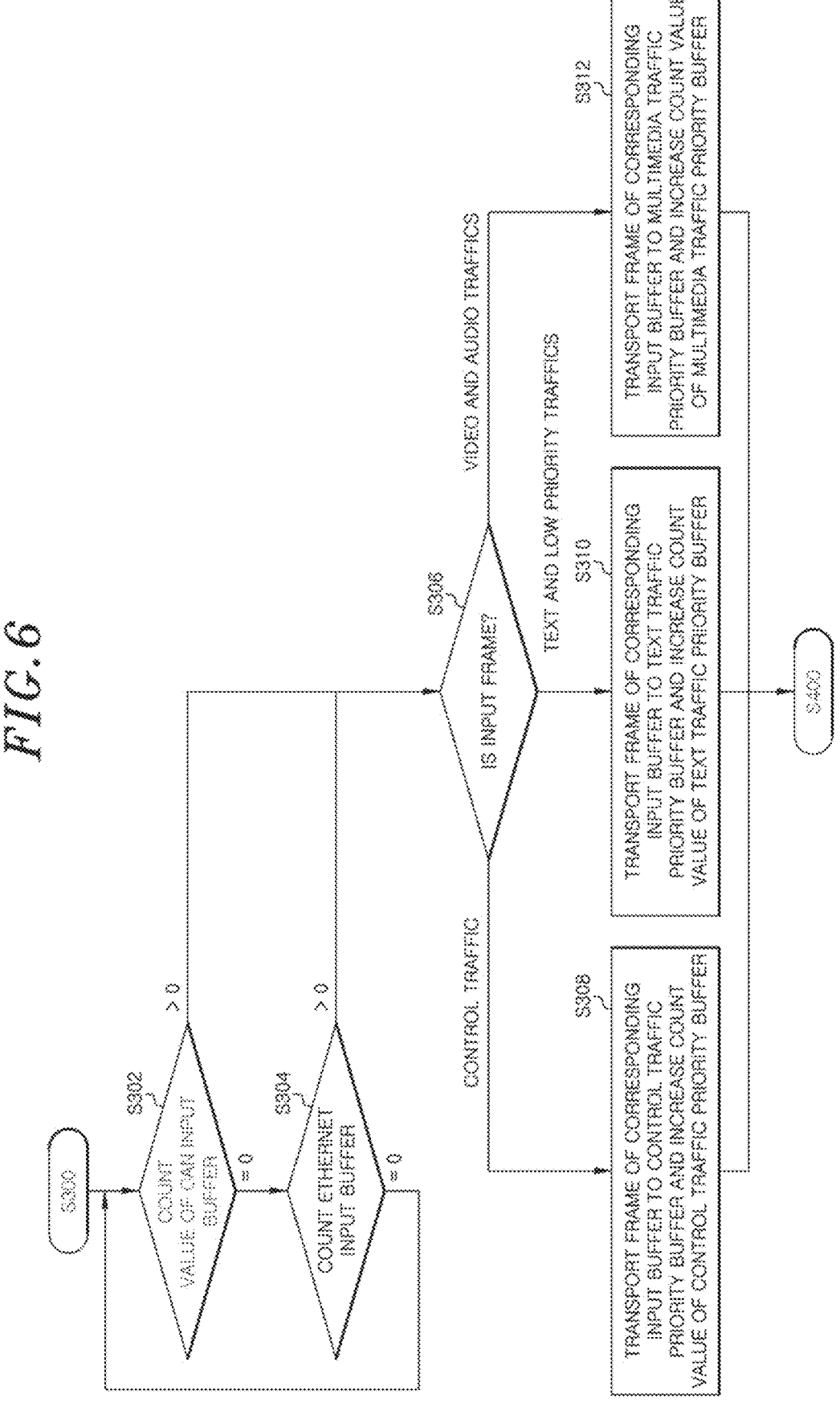
FIG. 6 is a flowchart specifically explaining the priority buffer transport process (S300) in FIG. 4.

FIG. 6 is a flowchart specifically explaining the priority buffer transport process (S300) in FIG. 4, and is a diagram for illustratively explaining the process of transporting frames in each input buffer 202 or 204 to each of the priority buffers 304 to 310.

As illustrated in FIG. 6, the processor 300 may identify the count value of each input buffer 202 or 204 and performs a process of transporting the corresponding frame to each of the priority buffers 304 to 310.

The priority buffers 304 to 310 include buffers that may respectively store control data frames, video and audio data frames, text, and low priority data frames.

The priority criteria of data frames stored in the priority buffers 306 to 310 may be exemplified by 7 priority code point (PCP) values as illustrated in Table 2 below, and traffic classes by priority may be distinguished for each PCP value.

TABLE 2

| PCP valus | Priority | Traffic class |
|---|---|---|
| 7 | 7(Highest) | Network control |
| 6 | 6 | Internetwork control |
| 5 | 5 | Voice, <10 ms latency and jitter |
| 4 | 4 | Video, <10 ms latency and jitter |
| 3 | 3 | Critical applications |
| 2 | 2 | Excellent effort |
| 1 | 0 | Best effort |
| 0 | 1 | Background |

Specifically, in case that the count values of the input buffer for CAN data frames 202 and the input buffer for Ethernet data frames 204 are greater than 0 (S302) (S304), it is determined that a frame in each input buffer has been input, and the traffic type of the frame is identified (S306). To distinguish the traffic type of the corresponding frame, for example, CAN data frames may be distinguished through pre-designated ID items, and Ethernet data frames may be distinguished through PCP values.

If the type of frame is distinguished, it may be transported to each priority buffer and the count value indicating the number of frames may be increased (S308) (S310) (S312).

Figure 7:
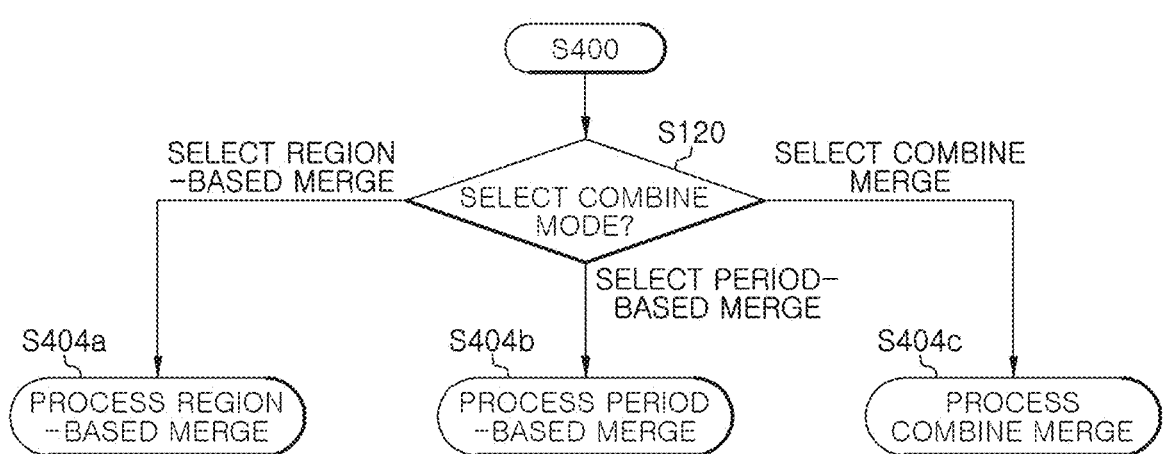
FIG. 7 is a flowchart specifically explaining the merge process (S400) in FIG. 4.

FIG. 7 is a flowchart specifically explaining the merge process (S400) in FIG. 4, and is a diagram for illustratively explaining the standby frame merge process of the control frame priority buffer 304. The standby frame merge process according to an embodiment of the disclosure may select at least one merge process among a region-based merge process, a period-based merge process, and a combine merge process that combines region-based merge and period-based merge, and selectively process the at least one selected merge process.

For example, as illustrated in FIG. 7, in case that the region-based merge is selected in the standby frame merge mode selection operation, the region-based merge process may be processed (S402, S404*a*), and in case that the period-based merge is performed in the standby frame merge mode selection operation, the period-based merge process may be processed (S402, S404*b*), and in case that the combine merge is selected in the standby frame merge mode selection operation, the combine merge process may be processed (S402, S404*c*).

Figure 8:
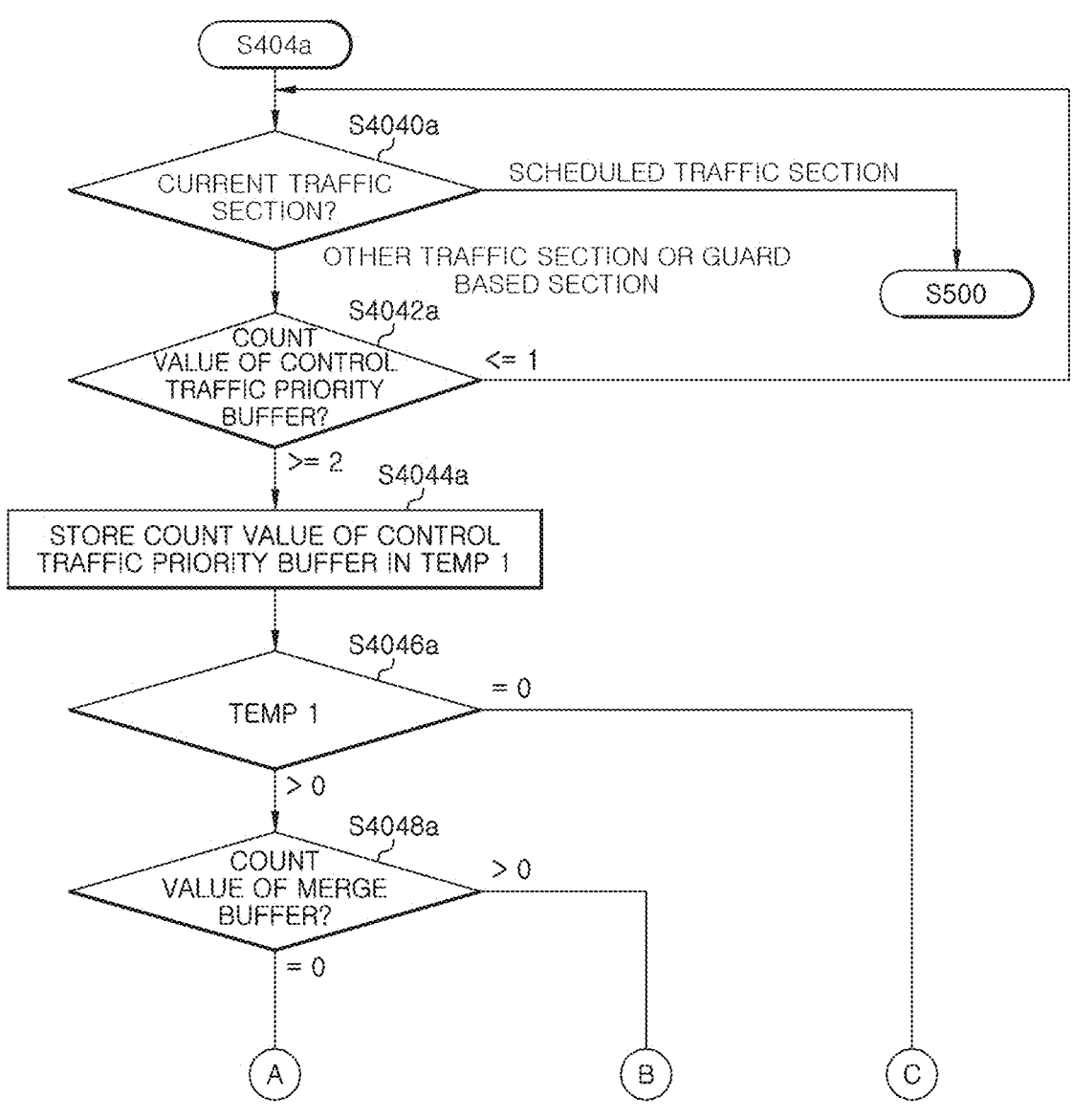
FIG. 8 is a diagram specifically explaining the region-based merge process in the merge process (S400) in FIG. 4.

FIG. 8 is a diagram specifically explaining the region-based merge process (S404*a*).

As illustrated in FIG. 8, in operation S4040*a*, the processor 300 determines whether a current traffic section is a scheduled traffic section, and if the current traffic section is the scheduled traffic section, the processor 300 proceeds to operation S500 to transmit control data frames.

On the other hand, if the current traffic section is the other traffic section or guard band section, the processor 300 performs a process of identifying the count value of the control frame priority buffer 304 to identify the number of frames in the control frame priority buffer 304 (S4042*a*).

In case that the count value of the control frame priority buffer 340 is 1 or less, it is determined that there are no frames that may be merged, and the process may be fed back to operation S4040*a*.

On the contrary, in case that the count value of the control frame priority buffer 304 is 2 or more, the processor 300 may perform the region-based frame merge operation.

For the region-based merge operation, the processor 300 may store the count value of the control frame priority buffer 304 in a separate temporary storage file temp1 (S4044*a*).

Thereafter, the temporary storage count value of the temporary storage file is used to measure the number of times the region-based frame merge operation is performed, and the test may be repeated until the count value becomes 0 according to the conditions of operation S4044*a*.

In case that the count value of the temporary storage file is greater than 0, it means that there are additional frames to be merged, and the region-based frame merge process is performed (S4046*a*). In case that the count value of the temporary storage file is 0, process C in FIG. 13, which will be described later, may be performed.

The region-based frame merge operation may include the processes of transporting the frames in the control frame priority buffer 304 to a merge buffer, which is a specific temporary buffer, merging them into one frame, and then returning the merged frame to the control frame priority buffer 304.

For this operation, in case that the count value of the temporary storage file is greater than 0, a process of comparing the count value of the merge buffer is performed (S4048*a*).

In case that the count value of the merge buffer is 0, process A in FIG. 11 may be performed, and in case that the count value of the merge buffer is greater than 0, process B in FIG. 12 may be performed.

Figure 9:
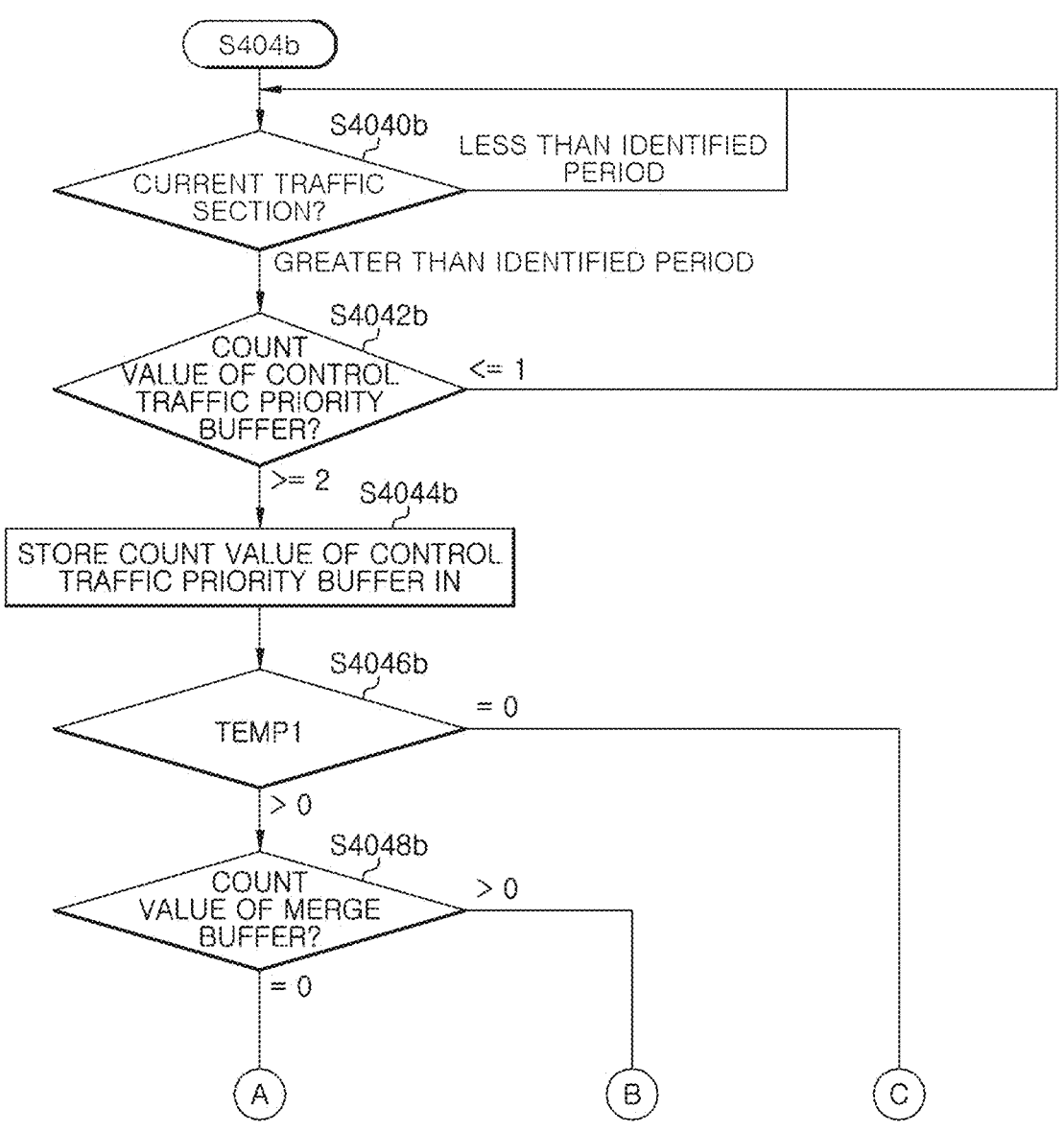
FIG. 9 is a diagram for specifically explaining the period-based merge process in the merge process (S400) in FIG. 4.

FIG. 9 is a diagram for specifically explaining the period-based merge process (S404*b*).

As illustrated in FIG. 9, in operation S4040*b*, the processor 300 performs a merge period identification process to perform the period-based frame merge operation.

The merge period of frames may be determined by the period set by the developer and the traffic section generated by the traffic section set table 314 described above. Therefore, the processor 300 may determine whether the count of the merge cycle timer is less than or greater than a threshold period and perform a process of identifying whether the priority current frame merge period has been reached.

As a result of the determination in operation S4040*b*, if the count of the merge cycle timer is greater than a threshold cycle and reaches the current frame merge period, the count value of the corresponding timer may be automatically initialized.

On the other hand, in case that the merge period and current traffic region satisfy the set conditions, the processor 300 performs the process of identifying the count value of the control frame priority buffer 304 to identify the number of frames in the control frame priority buffer 304 (S4042*b*).

In case that the count value of the control frame priority buffer 340 is 1 or less, it is determined that there are no frames that may be merged, and the process may be fed back to operation S4040*b*.

On the contrary, in case that the count value of the control frame priority buffer 304 is 2 or more, the processor 300 may perform the period-based frame merge operation.

For the period-based merge operation, the processor 300 may store the count value of the control frame priority buffer 304 in a separate temporary storage file temp1 (S4044*b*).

Thereafter, the temporary storage count value of the temporary storage file is used to measure the number of times the period-based frame merge operation is performed, and the test may be repeated until the count value becomes 0 according to the conditions of operation S4044*b*.

In case that the count value of the temporary storage file is greater than 0, it means that there are additional frames to merge, and the period-based frame merge process is performed (S4046*b*). In case that the count value of the temporary storage file is 0, process C in FIG. 13, which will be described later, may be performed.

The period-based frame merge operation includes the process of transporting the frames in the control frame priority buffer 304 to a specific temporary buffer, which is the merge buffer, merging them into one frame, and then returning the merged frame to the control frame priority buffer 304.

For this operation, in case that the count value of the temporary storage file is greater than 0, a process of comparing the count value of the merge buffer is performed (S4048*b*).

In case that the count value of the merge buffer is 0, process A in FIG. 11 may be performed, and in case that the count value of the merge buffer is greater than 0, process B in FIG. 12 may be performed.

Figure 10:
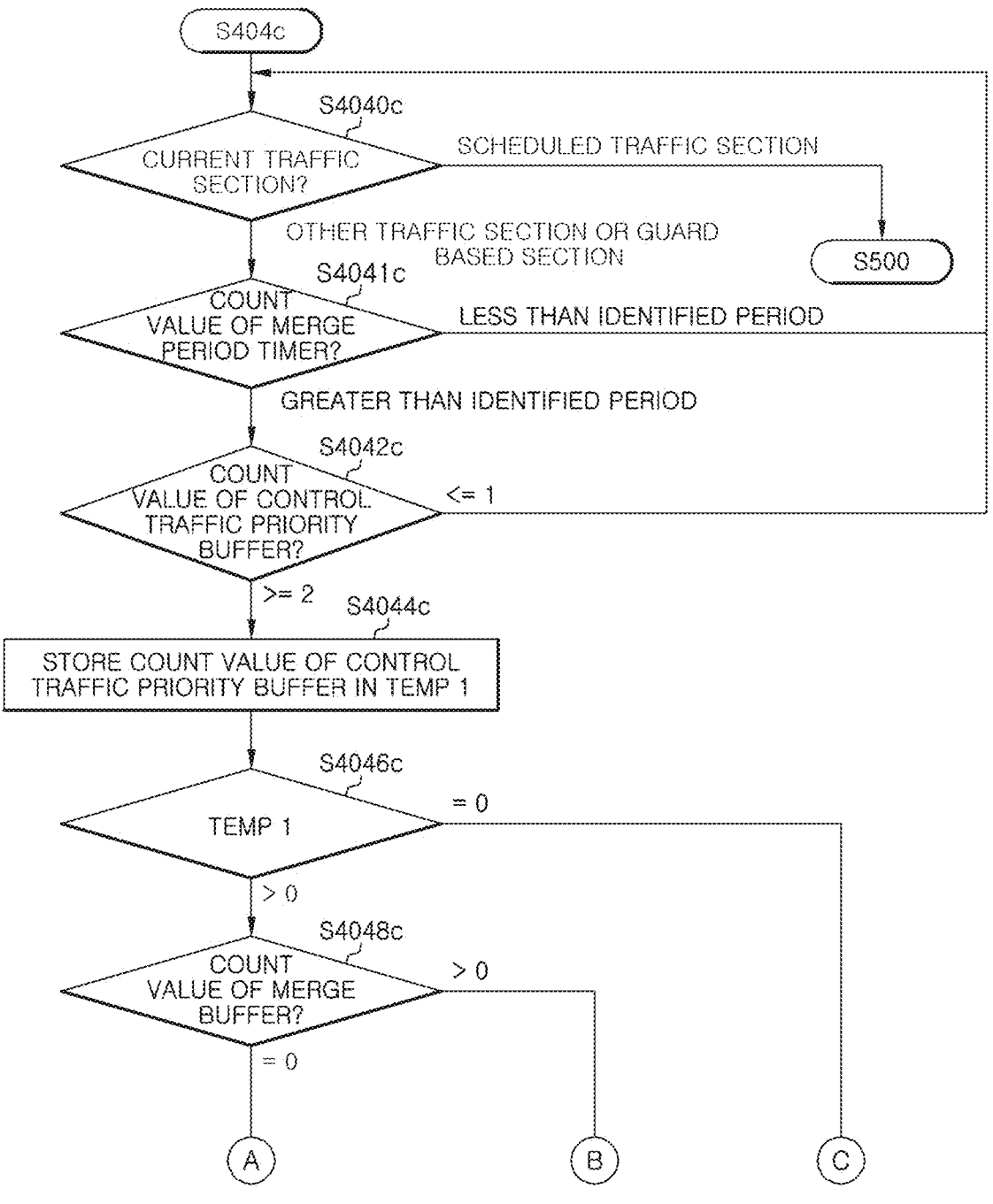
FIG. 10 is a diagram specifically explaining the combine merge process in the merge process (S400) in FIG. 4.

FIG. 10 is a diagram specifically explaining the combine merge process (S404*c*).

As illustrated in FIG. 10, in operation S4040*c*, the processor 300 determines whether the current traffic section is a scheduled traffic section, and if the current traffic section is the scheduled traffic section, the processor 300 proceeds to operation S500 to transmit control data frames.

On the other hand, if the current traffic section is the other traffic section or guard band section, the processor 300 performs a merge period identification process to perform a merge-type frame merge operation (S4041*c*).

The merge period of frames may be determined by the period set by the developer and the traffic section generated by the traffic section set table 314 described above. Therefore, the processor 300 may determine whether the count of the merge period timer is less than or greater than a threshold cycle and performs a process of identifying whether the priority current frame merge period has been reached.

As a result of the determination in operation S4041*c*, if the count of the merge period timer is greater than a threshold cycle and reaches the current frame merge period, the count value of the timer may be automatically initialized.

On the other hand, as a result of the determination in operation S4041*c*, in case that the merge period and current traffic region satisfy the set conditions, the processor 300 performs the process of identifying the count value of the control frame priority buffer 304 to identify the number of frames in the control frame priority buffer 304 (S4042*c*).

In case that the count value of the control frame priority buffer 340 is 1 or less, it is determined that there are no frames that may be merged, and the process may be fed back to operation S4040*c*.

On the contrary, in case that the count value of the control frame priority buffer 304 is 2 or more, the processor 300 may perform a combine frame merge operation.

For a combine merge operation, the processor 300 may store the count value of the control frame priority buffer 304 in a separate temporary storage file temp1 (S4044*c*).

Thereafter, the temporary storage count value of the temporary storage file is used to measure the number of times the combine frame merge operation is performed, and the test may be repeated until the count value becomes 0 according to the conditions of operation S4044*c*.

In case that the count value of the temporary storage file is greater than 0, it means that there are additional frames to be merged, and the period-based frame merge process is performed (S4046*c*). In case that the count value of the temporary storage file is 0, process C in FIG. 13, which will be described later, may be performed.

The period-based frame merge operation may include the process of transporting the frames of the control frame priority buffer 304 to a specific temporary buffer, which is the merge buffer, merging them into one frame, and then returning the merged frame to the control frame priority buffer 304.

For this operation, in case that the count value of the temporary storage file is greater than 0, a process of comparing the count value of the merge buffer is performed (S4048*c*).

In case that the count value of the merge buffer is 0, process A in FIG. 11 may be performed, and in case that the count value of the merge buffer is greater than 0, process B in FIG. 12 may be performed.

FIG. 11 is a flowchart for illustratively explaining a case in which the count of the merge buffer is 0 during the merge process in FIGS. 8 to 10.

First, the processor 300 may transport the control data frame stored in the control frame priority buffer 304 to the merge buffer (S410).

Thereafter, the processor 300 may increase the offset value by the size of the transported frame (S412) and adjust the count value of the temporary storage file and count value of the merge buffer (S414). For example, the count value of the temporary storage file may be decreased by 1 and the count value of the merge buffer may be increased by 1.

Here, the offset value refers to position information for concatenating two frames.

On the contrary, in case that the count value of the merge buffer is greater than 0, process B in FIG. 12 may be performed.

FIG. 12 is a flowchart for illustratively explaining a case in which the count of the merge buffer exceeds 0 during the merge process in FIGS. 8 to 10.

If the count value of the merge buffer is greater than 0, it means that there are frames that have already undergone the merge process.

In the case of FIG. 12, it is necessary to perform a process of concatenating the control data frames of the control frame priority buffer 304 starting from the offset position of the frame in the merge buffer (S416).

After performing the process of transporting and copying the control data frame of the control frame priority buffer 304 to the offset position of the frame in the merge buffer as in operation S416, the processor 300 may adjust the offset value and the count value of the temporary storage file (S418, S420). For example, the frame and offset values of the merge buffer may be increased by the size of the control data frame, and the count value of the temporary storage file may be decreased by 1.

Figure 13:
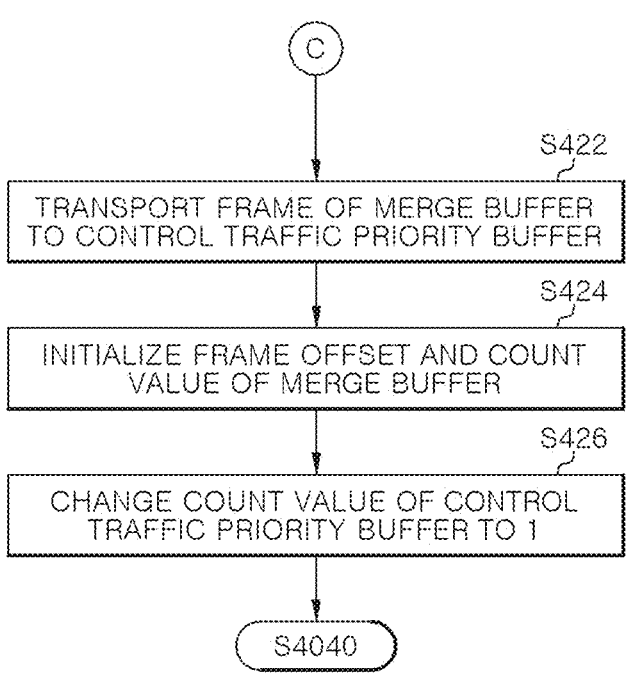
FIG. 13 is a flowchart for illustratively explaining a case in which the temporary file storage count of the count value of the control frame priority buffer is 0 in the merge process in FIGS. 8 to 10.

In this way, the frame merge operation may be performed through the process of operations (S4046, S4048, and S410 to S420), and when the count value of the temporary storage file becomes equal to 0 in S4046, the control frame priority buffer is processed as in operation C in FIG. 13. This may mean that all of the frames in the control frame priority buffer 304 are merged.

FIG. 13 is a flowchart for illustratively explaining a case in which the temporary file storage count of the count value of the control frame priority buffer is 0 in the merge process in FIGS. 8 to 10.

In case that the count value of the temporary storage file is equal to 0, the processor 300 may transport the frame in the merge buffer to the control frame priority buffer 304 (S422).

Also, the processor 300 may initialize the frame offset and count values of the merge buffer (S424).

Since the frames in the existing control frame priority buffer 304 have been merged into one frame, the count value of the corresponding buffer 304 is changed to 1 (S426).

Figures 14A, 14B, 14C:
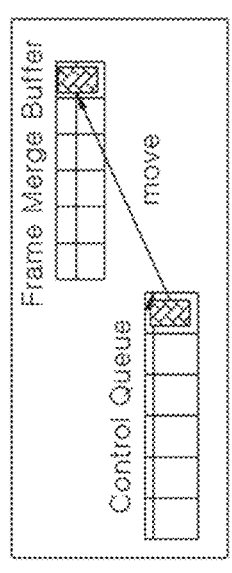
FIGS. 14A to 14C are conceptual diagrams for illustratively explaining FIGS. 11 to 13 in the merge process of FIGS. 8 to 10.

FIGS. 14A to 14C are conceptual diagrams for illustratively explaining FIGS. 11 to 13 in the merge process of FIGS. 8 to 10.

As illustrated in FIG. 14A illustrates the case of performing process A in FIG. 11, and illustrates the case of transporting the control data frame stored in the control frame priority buffer 304 to the merge buffer.

FIG. 14B illustrates the case of performing process B in FIG. 12, and illustrates the case where the control data frames of the control frame priority buffer 304 are concatenated starting from the offset position of the frame in the merge buffer.

Also, FIG. 14C illustrates the case in which process C in FIG. 13 is performed, and illustrates the case in which a frame in the merge buffer is transported to the control frame priority buffer 304.

Figure 15:
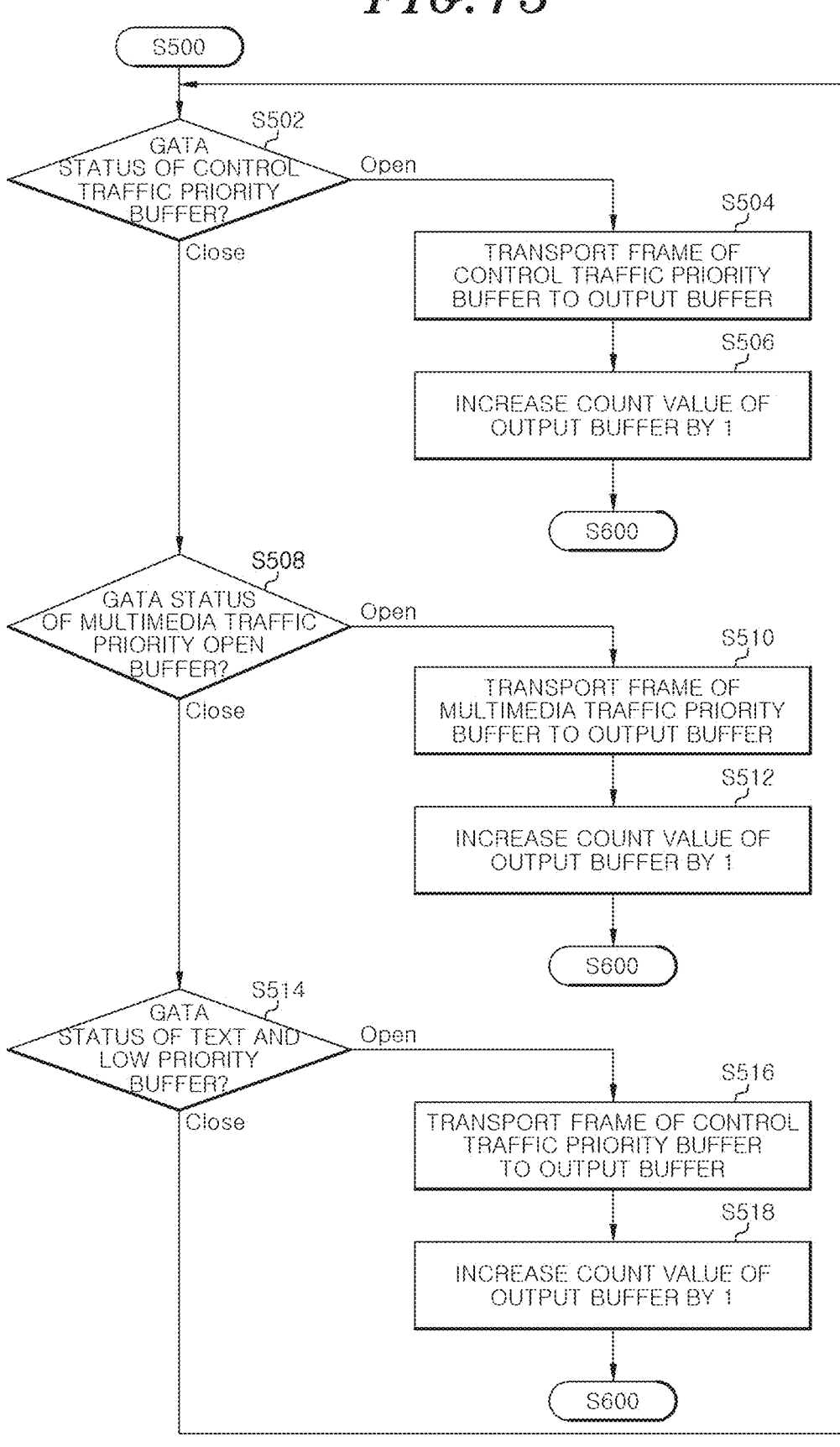
FIG. 15 is a flowchart specifically explaining the process (S500) of transporting to the output buffer 402 in FIG. 4.

FIG. 15 is a flowchart specifically explaining the process (S500) of transporting to the output buffer 402 in FIG. 4, and illustrates the process of controlling the operation of each gateway on the basis of the traffic section set table and transporting the frame stored in each of the priority buffers 306 to 310 to the output buffer 402.

First, if the first gateway 316a connected to the control frame priority buffer 304 is in an open state (S502), the processor 300 may transport the frame in the control frame priority buffer 304 to the output buffer 402 (S504), and increase the count value of the output buffer 402 by 1 (S506).

On the other hand, if the first gateway 316a remains in the closed state and the second gateway 316b connected to the multimedia frame priority buffers 306 and 308 is open (S508), the processor 300 may transport the frames of the multimedia frame priority buffers 306 and 308 to the output buffer 402 (S510), and increase the count value of the output buffer 402 by 1 (S512).

On the other hand, if the second gateway 316b remains in the closed state and the third gateway 316c or 316d connected to the text frame priority buffer 310 is in an open state (S514), the processor 300 may transport the frame of the text frame priority buffer 310 (or low priority buffer) to the output buffer 402 (S516), and increase the count value of the output buffer 402 by 1 (S518).

Figure 16:
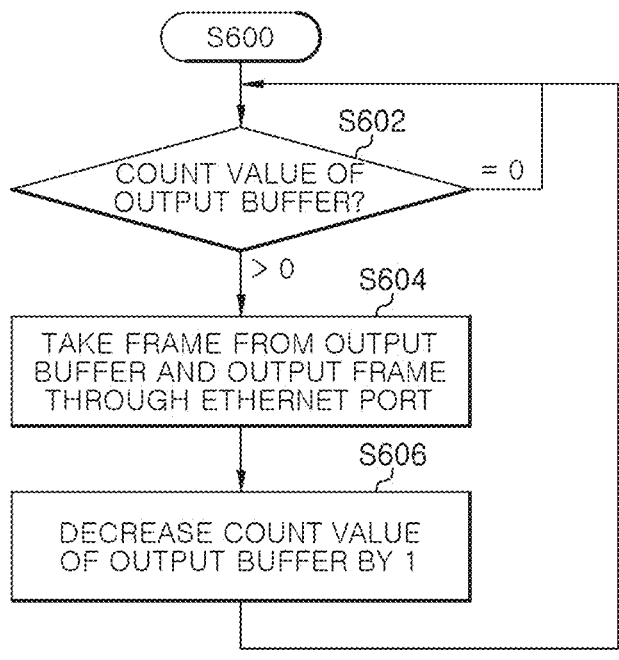
FIG. 16 is a flowchart specifically explaining the Ethernet port output process (S600) in FIG. 4.

FIG. 16 is a flowchart specifically explaining the Ethernet port output process (S600) in FIG. 4.

The process in FIG. 16 explains the process of outputting the frame in the output buffer 402 to the Ethernet port.

As illustrated in FIG. 16, in operation S602, the count value of the output buffer 402 is identified, and in case that the count value is greater than 0, the frame in the output buffer 402 is output to the Ethernet port (S604), and then the count value may be decreased by 1 (S606).

Meanwhile, in an embodiment of the disclosure, the performance of the disclosure was compared assuming that the frames shown in Table 3 below are transmitted at regular intervals through lower level ECUs.

TABLE 3

| Frame type | ID (hex) | Priority | Interval (ms) | Size (byte) | Count | Note |
|---|---|---|---|---|---|---|
| CAN | 4B0 | 7 | 10 | 8 | 990 | Control traffic |
| | 4B1 | 7 | 20 | 8 | 496 | |
| Ethernet | — | 4 | 16 | 968 | 619 | Multimedia traffic(Video) |
| | — | 5 | 64 | 64 | 155 | Multimedia traffic(Voice) |

For example, a first ECU transmits a frame called ID 4B0 through the CAN network, and a second ECU transmits a frame called ID 4B1. Then, a third ECU transmits two Ethernet frames.

Each frame is assigned a priority. The two CAN frames have a priority of 7 and correspond to control traffic, and the Ethernet frames correspond to video and audio among multimedia information. In addition, the TSN system implemented in the first end system may constitute the traffic region as shown in [Table 4] below by the algorithm applied to an embodiment of the disclosure.

TABLE 4

| Cycle | Guard band | Scheduled Traffic | Other traffic |
|---|---|---|---|
| 500 us | 25 us | 100 us | 375 us |

Thereafter, in order to comparatively analyze the performance of the disclosure, a total of four methods were compared with each other as shown in Table 5 below. In order to verify the effectiveness of the method proposed in the embodiment of the disclosure, the performance of each of the four methods was compared as illustrated in FIGS. 17A to 17D.

TABLE 5

| No | Merge method | Jitter | | |
| | | Min(us) | Max(us) | σ |
|---|---|---|---|---|
| 1 | Non-merge | 3 | 103.7 | 247.14 |
| 2 | Region-based merge | 1 | 935 | 226.17 |
| 3 | Period-based merge | 1 | 829 | 225.11 |
| 4 | Period + Region-based merge | 1 | 642 | 175.86 |

As can be seen in Table 5 and FIGS. 17A to 17D, method 1 is a case where the frame merge method is not used, and method 2 is a region-based merge process in which the frames are merged in only the guard band in the other traffic section. Further, method 3 is a period-based merge process in which frames are merged and transmitted at each designated frame merge period. In this experiment, the merge period was set at 30 ms intervals.

Lastly, method 4 is a combine merge process proposed through an embodiment of the disclosure, that is, a merge process that combines the region-based merge process and the period-based merge process.

As shown in Table 5 and FIGS. 17A to 17D, it can be seen that the combine merge method combining the region-based merge and period-based merge has the smallest maximum jitter value and the lowest standard deviation. Through this, it can be confirmed that among the data frame merge methods according to an embodiment of the disclosure, the combine merge method is relatively superior in terms of performance.

Figure 18A:
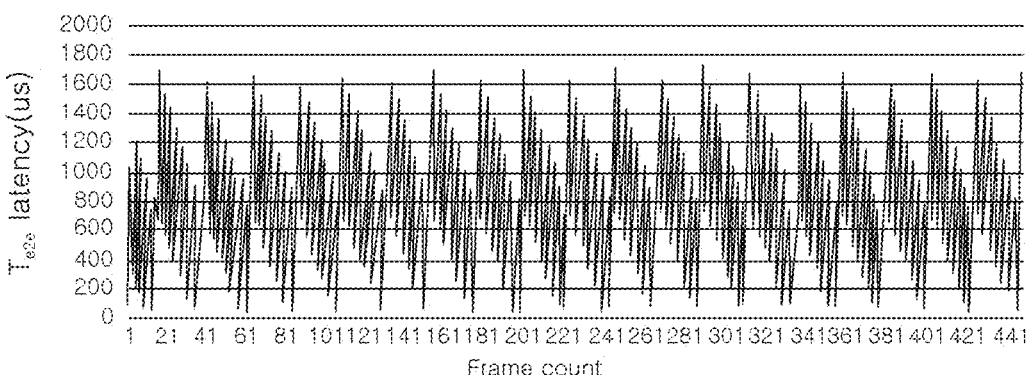
FIGS. 18A to 18C are graphs comparing the latency performance of three different methods to verify the effectiveness of the method proposed in an embodiment of the present invention.
Figure 18B:
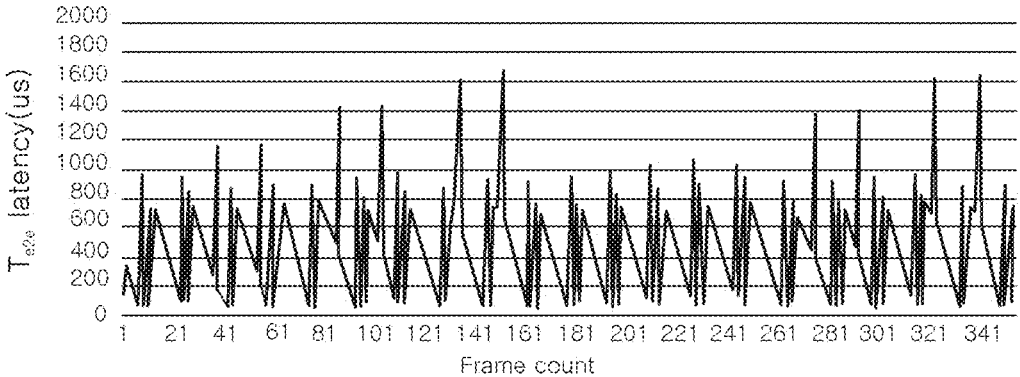
Figure 18C:
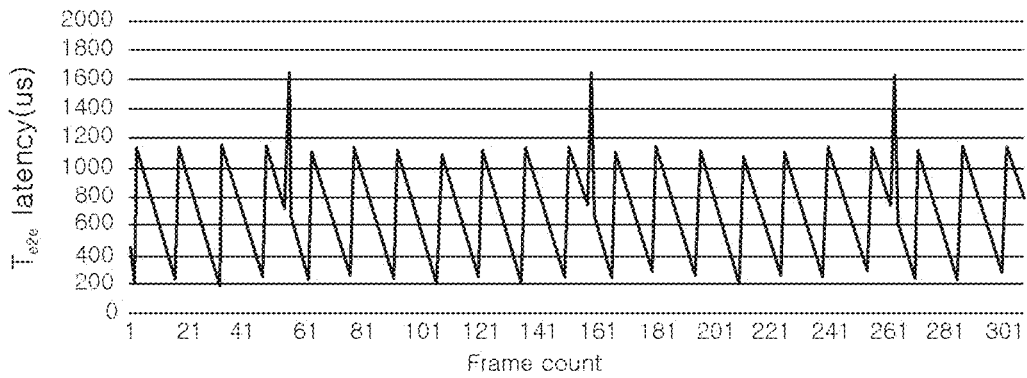

In addition, FIGS. 18A to 18C are graphs comparing the latency for frame merge. FIG. 18A illustrates a graph of a case in which the frame merge method is not used, FIG. 18B illustrates a graph of a case in which the region-based merge method is applied, and FIG. 18A illustrates a graph of a case of applying each period-based merge method.

As can be seen in FIGS. 18A to 18C, even without using the combine merge method, the region-based merging method or period-based merging method according to an embodiment of the disclosure was able to obtain better results in latency performance compared to the existing method.

According to an embodiment of the disclosure as described above, in case that multiple control data frames including CAN data frames are merged into an Ethernet frame and transmitted, the overhead for the Ethernet header is reduced. In addition, according to an embodiment of the disclosure, during a time period in which a control data frame received in a section other than a scheduled traffic is standby in the priority buffer, multiple standby frames are merged and transmitted to a higher level switching device, thereby minimizing a frame transmission time.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for merging dataframes, performed by a data frame merge device for a vehicle network system, the method comprising:

receiving a plurality of control data frames from a lower level of the vehicle network system; and merging the plurality of control data frames for a preset standby time in a traffic section in which the plurality of the control dataframes is not transmitted to a higher level of the vehicle network system, wherein merging the plurality of control data frames alternatively includes merging the plurality of control data frames with a plurality of pre-stored standby frames on the basis of a count value of a merge buffer of the data frame merge device when the plurality of the control data frames is transmitted in the traffic section that is not connected to an output buffer of the data frame merge device.

2. The method of claim 1, wherein the merging the plurality of control data frames includes storing the plurality of the control data frames as a plurality of standby frames.

3. The method of claim 2, wherein the merging the plurality of control data frames includes:

identifying the count value of the merge buffer;

storing the plurality of the control data frames as the plurality of the standby frames in the merge buffer if the count value of the merge buffer is 0; and storing a plurality of merge control data frames obtained by merging the plurality of the control data frames with the plurality of the pre-stored standby frames in the merge buffer if the count value of the merge buffer exceeds 0.

4. The method of claim 3, further comprising:

storing a plurality of controller area network (CAN) data frames and a plurality of Ethernet data frames received from a control device provided in the vehicle network system in each input buffer;

extracting the plurality of the control data frames from the CAN data frame and storing the plurality of the control data frames in a control frame priority buffer; and extracting a plurality of multimedia data frames and a plurality of text data frames from the plurality of the Ethernet data frames, and storing the plurality of the multimedia data frames in a multimedia frame priority buffer and the plurality of the text data frames in a text frame priority buffer, respectively.

5. The method of claim 4, wherein the traffic section includes a scheduled traffic section, an other traffic section, and a guard band section, wherein the scheduled traffic section is the traffic section in which the plurality of the control data frames is transmitted in connection with the output buffer, wherein the other traffic section is the traffic section in which the plurality of the multimedia data frames or the plurality of the text data frames is transmitted in connection with the output buffer, and wherein the guard band section is a section in which all of the plurality of the control data frames, the plurality of the multimedia data frames, and the plurality of the text data frames are not transmitted to the output buffer.

6. The method of claim 5, wherein the merging the plurality of control data frames further includes temporarily storing a count value of the control frame priority buffer if a current traffic section of the plurality of the control data frames is the other traffic section or the guard band section and the count value of the control frame priority buffer is 2 or more.

7. The method of claim 5, wherein the merging the plurality of control data frames further includes temporarily storing a count value of the control frame priority buffer if a count value of a period in which data for the merge buffer is stored exceeds a predetermined threshold period, and the count value of the control frame priority buffer is 2 or more.

8. The method of claim 5, wherein the merging the plurality of control data frames further includes temporarily storing a count value of the control frame priority buffer if a current traffic section of the plurality of the control data frames is the other traffic section or the guard band section, a count value of a period in which data for the merge buffer is stored exceeds a predetermined threshold period, and the count value of the control frame priority buffer is 2 or more.

9. The method of claim 8, wherein the merging the plurality of control data frames further includes transporting the plurality of the control data frames stored in the control frame priority buffer to the merge buffer if a temporary storage count value of the control frame priority buffer exceeds 0 and a count value of a period in which data for the merge buffer is stored is 0.

10. The method of claim 8, wherein the merging the plurality of control data frames further includes transporting a plurality of control data frames stored in the control frame priority buffer to an offset position of the standby frame stored in the merge buffer if a temporary storage count value of the control frame priority buffer exceeds 0 and a count value of a period in which data for the merge buffer is stored exceeds 0.

11. The method of claim 8, wherein the merging the plurality of control data frames further includes transporting the plurality of the merge control data frames stored in the merge buffer to the control frame priority buffer if a temporary storage count value of the control frame priority buffer is 0.

12. A device for merging data frames for a vehicle network system, the device comprising:

a memory configured to store one or more instructions; and a processor configured to execute the one or more instructions stored in the memory, wherein the instructions, when executed by the processor, cause the processor to:

store a plurality of controller area network (CAN) data frames and a plurality of Ethernet data frames received from a control device provided in the vehicle network system in each input buffer;

extract a plurality of the control data frames from the plurality of the CAN data frames, and extract a plurality of multimedia data frames and a plurality of text data frames from the plurality of the Ethernet data frames;

set a traffic section to transport at least one of the plurality of the control data frames, the plurality of multimedia data frames, and the plurality of text data frames to an output buffer through a transport section; and store the plurality of the control data frames in the plurality of the CAN data frames as a plurality of standby frames or merge the plurality of the control data frames with a plurality of pre-stored standby frames and transport the plurality of the merged the control data frames to the output buffer in a traffic section in which the plurality of the control data frames is not transmitted to the output buffer.

13. The device of claim 12, wherein the processor is configured to preferentially extract the plurality of the control data frames, the plurality of multimedia data frames, and the plurality of text data frames, store the plurality of the control data frames in a control frame priority buffer in queue format, and store the plurality of the control data frames as the plurality of standby frames or a plurality of merge control data frames merged the plurality of the control data frames with the plurality of pre-stored standby frames in a merge buffer.

14. The device of claim 13, wherein the traffic section includes a scheduled traffic section, an other traffic section, and a guard band section, and wherein the processor is configured to temporarily store a count value of the control frame priority buffer if a current traffic section of the plurality of the control data frames is the other traffic section or the guard band section and the count value of the control frame priority buffer is 2 or more.

15. The device of claim 13, wherein the processor is configured to temporarily store a count value of the control frame priority buffer if a count value of a period in which data for the merge buffer is stored exceeds a predetermined threshold period, and the count value of the control frame priority buffer is 2 or more.

16. The device of claim 13, wherein the processor is configured to store the plurality of multimedia data frames in a multimedia data frame priority buffer in the queue format, and store the plurality of text data frames in a text data frame priority buffer in the queue format.

17. The device of claim 13, wherein the processor includes a first gateway configured to be opened in the scheduled traffic section to transport the plurality of the control data frames stored in the control frame priority buffer to the output buffer, a second gateway configured to be opened in the other traffic section to transport the plurality of the multimedia data frames stored in the multimedia data frame priority buffer to the output buffer, and a third gateway configured to be opened in the other traffic section to transport the plurality of the text data frames stored in the text data frame priority buffer to the output buffer.

18. The device of claim 13, wherein the processor is configured to open the first gateway and to close the second gateway and the third gateway in the scheduled traffic section, to open the second gateway or the second gateway and to close the first gateway in the other traffic section, and to close the first gateway, the second gateway, and the third gateway in the guard band section.

19. The device of claim 18, wherein the multimedia data frame priority buffer includes video multimedia frame priority buffer and audio multimedia frame priority buffer, and wherein the processor includes a weight filter configured to set weights to maintain relative balance for a video frame and an audio frame output from the video multimedia frame priority buffer and the audio multimedia frame priority buffer, respectively, and output the video frame and the audio frame as a single multimedia frame data, a second priority filter configured to determine output according to the priority between the single multimedia frame data that has passed the weight filter and the plurality of the text data frames stored in the text frame priority buffer, and a data frame scheduler configured to schedule one data frame to be transported to the output buffer of the output unit through at least one priority buffer of the control frame priority buffer, the multimedia frame priority buffer, and the text frame priority buffer, on the basis of the open/close operations of the first gateway, the second gateway, and the third gateway.

20. A non-transitory computer readable storage medium storing computer executable instructions, wherein the instructions, when executed by a processor, cause the processor to perform a method for merging data frames, the method comprising:

receiving a plurality of control data frames from a lower level of the vehicle network system; and merging the plurality of control data frames for a preset standby time in a traffic section in which the plurality of the control data frames are not transmitted to a higher level of the vehicle network system, wherein merging the plurality of control data frames alternatively includes merging the plurality of control data frames with a plurality of pre-stored standby frames on the basis of a count value of a merge buffer of the data frame merge device when the plurality of the control data frames is transmitted in the traffic section that is not connected to an output buffer of the data frame merge device.

\*  \*  \*  \*  \*